United States Patent
Oh et al.

(10) Patent No.: US 11,038,943 B1
(45) Date of Patent: Jun. 15, 2021

(54) CONTENT OUTPUT SYSTEM AND METHOD USING MULTI-DEVICE BASE ON WEB-BROWSER

(71) Applicant: Cedar Inc., Gyeonggi-do (KR)

(72) Inventors: Eun Seok Oh, Gyeonggi-do (KR); Kyoung Dong Kim, Seoul (KR)

(73) Assignee: CEDAR INC., Gyeonggi-Do (KR)

( * ) Notice: Subject to any disclaimer, the term of this patent is extended or adjusted under 35 U.S.C. 154(b) by 0 days.

(21) Appl. No.: 16/787,303

(22) Filed: Feb. 11, 2020

(51) Int. Cl.
*G06F 15/16* (2006.01)
*H04L 29/06* (2006.01)
*H04L 29/08* (2006.01)
*H04L 7/00* (2006.01)

(52) U.S. Cl.
CPC .......... *H04L 65/608* (2013.01); *H04L 7/0008* (2013.01); *H04L 65/1069* (2013.01); *H04L 67/02* (2013.01); *H04L 67/1042* (2013.01)

(58) Field of Classification Search
CPC ... H04L 65/608; H04L 65/1069; H04L 67/02; H04L 67/1042; H04L 7/0008
USPC .......................................... 709/208, 217–219
See application file for complete search history.

(56) References Cited

U.S. PATENT DOCUMENTS

| 9,986,014 | B2 * | 5/2018 | Saint-Hilaire | H04L 65/1069 |
| 10,217,257 | B1 * | 2/2019 | Kumar | G06F 16/9577 |
| 10,692,471 | B2 * | 6/2020 | Kim | G06F 3/1446 |
| 10,725,721 | B2 * | 7/2020 | Akiyama | G06F 3/041661 |
| 2009/0021496 | A1 * | 1/2009 | Silzars | G09F 13/22 345/204 |
| 2009/0327893 | A1 * | 12/2009 | Terry | G06F 3/1438 715/719 |
| 2010/0281402 | A1 * | 11/2010 | Staikos | G06F 16/957 715/760 |
| 2015/0304379 | A1 * | 10/2015 | Ezell | H04L 65/1069 709/219 |
| 2017/0093925 | A1 * | 3/2017 | Sheretov | H04L 63/20 |
| 2018/0052649 | A1 * | 2/2018 | Patel | H04W 4/80 |
| 2018/0160055 | A1 * | 6/2018 | Taine | G06K 9/00302 |
| 2021/0037095 | A1 * | 2/2021 | Ratias | H04L 67/22 |

FOREIGN PATENT DOCUMENTS

KR 10-1513413 B1 4/2015

* cited by examiner

*Primary Examiner* — Bharat Barot
(74) *Attorney, Agent, or Firm* — The PL Law Group, PLLC

(57) ABSTRACT

A content output system according to an embodiment of the present invention includes a web server for providing contents to be output to a web-connected terminal, and devices connected to the web server to output the contents, the devices respectively outputting a predetermined area of each content. The devices may be operated by a WebRTC. The devices may include a master device for generating and providing content synchronization information and a synchronization signal for specifying an output timing of the contents to be output, and at least one slave device for outputting the contents according to the content synchronization information and the synchronization signal provided from the master device. The master device and the slave device are set among the devices constituting the multi-vision so that the synchronization and synchronization between the multiple devices without a separate control terminal, thereby simplifying the system configuration and reducing the cost.

12 Claims, 9 Drawing Sheets

CONTENT OUTPUT SYSTEM AND METHOD USING MULTI-DEVICE BASE ON WEB-BROWSER

TECHNOLOGY

The present invention relates to a system and method for constructing a large-scale output device using multiple display devices and outputting the content through the multi-display device, and more specifically, each device is a P2P communication based on a web browser without a separate control device. The present invention relates to a content output system and method using a web browser based on multiple device connected to each other to synchronize sync and schedule of output content between devices.

TECHNICAL BACKGROUND

Recently, as the demand for larger display devices has increased, a large display device having a size that cannot be realized as a single display device is implemented by implementing a single display device by connecting a plurality of display devices.

On the other hand, as the resolution of content is also increased, an ultra-high definition image device supporting Ultra High Definition (UHD) resolution of higher than HD (High Definition) resolution is being used.

In the case of 4K UHD, the UHD contents are divided into four HD images to form one image frame, and in the case of 8K, the UHD contents are divided into 16 HD images or divided into 4K UHD images.

Accordingly, the need for a multi-vision system is increasing in order to output a plurality of divided images obtained by dividing the image content through a plurality of different display apparatuses, respectively.

In this case, each output device may decode a frame of the divided image corresponding to a portion of the UHD image frame according to a preset clock signal and output the decoded image through the display device.

In the process of outputting a frame of the divided image through the plurality of output devices, a clock deviation occurs due to an image processing delay or a delay in a buffering process between a plurality of different output devices. As a result, a problem arises in that a frame of a divided image constituting another UHD image frame is output to some frames constituting one UHD image frame.

In order to prevent the occurrence of such a deviation, the synchronization device transmits a clock signal as the synchronization signal to each output device, and the output device receiving the synchronization signal corrects an error of the clock signal in accordance with the synchronization signal. However, when a continuous image frame delay occurs in some output devices, it is difficult to reproduce UHD images normally because correction is performed only upon reception of a synchronization signal depending on only a synchronization signal.

In order to solve this problem, Korean Patent No. 10-1513413 discloses a technique for synchronizing and outputting UHD-class video through a video output device consisting of a matrix based on the Android OS.

However, in the prior art as described above, a separate control terminal (multi-vision operating server) for controlling the reproduction synchronization of each device is essential. When the control terminal becomes inoperable or the connection between the device and the control terminal is interrupted, there is a problem that synchronization of output contents is impossible.

In addition, in the prior art, since the control terminal and each device must be driven by the same OS, there was a problem that the system configuration is limited.

SUMMARY

The present invention has been made to solve the conventional problems as described above. The present invention is to provide a content output system and method using a multi-device to synchronize and synchronize between the multiple display devices without a separate control terminal by setting the master device and the slave device among the devices constituting the multi-vision.

The present invention provides a system and method for outputting content using multiple devices that allow each device to be P2P connected based on a web browser, thereby providing synchronization and synchronization with each other even between devices driven by different OSs.

The present invention also provides a content output system and method using multiple devices, by allowing any one of the output devices to be set as the master device, so that when the connection between the master device and the slave device is released, the device having good connection status is reset to the master device to sink and synchronize between the devices.

According to various embodiments of the present invention, content output system using a web browser based on multiple devices may comprise a web server for providing the output content to a web-connected terminal; and a plurality of devices connected to the web server to output the provided content, respectively outputting a predetermined area of the content.

Further, the devices may be operated by a web browser supporting Web Real Time Communication (WebRTC).

Further, the devices may include a master device for generating and providing content synchronization information for specifying a time-series order of the contents to be output and a synchronization signal for specifying an output timing of the output contents; and the slave device for outputting the content according to the content synchronization information and the synchronization signal provided from the master device.

Further, each of the devices may be connected to all other devices in a full mesh topology.

Further, the devices may be connected to each other through peer-to-peer communication through a real-time communication data channel (RTC Data Channel).

Further, the content synchronization information may be information indicating the order and start time of the output content.

Further, the synchronization signal may be a signal for synchronizing an output time of a specific frame constituting the output content, and is generated and provided in a predetermined time unit.

Further, if the output content includes additional output data, the master device may generate an additional output data synchronization signal for synchronizing an output time point and a position of the additional output data and provide the additional output data synchronization signal to a slave device.

Further, the additional output data may be caption or advertisement data.

In addition, the devices may be assigned in order to be designated as a master device; and one of the devices may be designated and changed as the master device by the order.

Further, the change of the master device may be changed when P2P communication of at least one of the master device and the slave devices is disconnected.

In addition, when one or more P2P communication of the master device and the slave devices are disconnected, the slave device in which the P2P communication connection is maintained with all other devices among the remaining slave devices except the master device and the slave device disconnected from the P2P communication with the master device, may be set as a new master device by receiving master authority from the master device.

If there is more than one slave device in which P2P communication connection is maintained with all other devices among the other slave devices except the slave device in which the P2P communication is disconnected from the master device and the master device, the priority of the new master device may be determined according to the P2P communication speed.

In addition, the P2P connection speed, which determines the priority of the new master device, may be determined by the order in which the slave device completes receiving a response message through P2P communication from all other devices.

Meanwhile, according to various embodiments of the present invention, the method for outputting content through a content output system may comprise a web server for providing a content to be output to a web-connected terminal, and a plurality of devices for outputting content provided by accessing the web server and dividing and outputting a predetermined area of the content.

Further the method may comprise (A) connecting to the web serve by the devices; (B) connecting the devices to each other in a peer to peer (P2P) communication through a web browser supporting Web Real Time Communication (WebRTC); (C) setting any one of the devices as a master device; (D) providing content synchronization information by the master device to the slave device to synchronize the content to be output; and (E) providing a synchronization signal by the master device to the slave device, and outputting contents by the devices according to the synchronization signal;

Further, the P2P communication connection between the devices of the step (B) may be a connection of a full mesh topology.

Further, the content synchronization information may be the information indicating the order and start time of the content to be output.

Further, the synchronization signal may be a signal for synchronizing the output time of a specific frame constituting the output content and provided in a predetermined time unit.

Further, if the output content includes additional output data, the method may comprise (F) generating an additional output data synchronization signal for synchronizing an output time point and position of the additional output data and providing the synchronization signal to a slave device; (G) adding the additional output data to the output content according to the additional output data synchronization signal and outputting the additional output data to the output content.

Further, the additional output data is caption or advertisement data.

Further, the method may further comprise (H) checking the P2P connection state between the master device and each slave device in performing the steps (D) to (G); and (I) resetting the master device when at least one of P2P communication between the master device and the slave devices is disconnected.

In this case, the setting and resetting of the master device may be performed by a predetermined order.

Further, the resetting the master device of step (I), may comprise (I11) transmitting, by the device recognizing the disconnection of the P2P connection, a master configuration request message to any one of the slave devices except the master device and the slave device in which P2P communication is disconnected from the master device;

(I12) sending, by the slave device receiving the master setup request message, a response request message to all other devices including the master device through the P2P communication;

(I13) transmitting, by the device receiving the response request message, a response signal through a P2P communication to the device transmitting the response request message;

(I14) transmitting a master change request message to a master device when the device which has sent the response request message has received a response signal from all devices which have sent the response request message;

(I15) sending, by the master device receiving the master change request message, master resetting information to a device which has transmitted the master change request message, and resetting the device which has transmitted the master change request message to a master device;

(I16) when a device for which a response signal is not received among the devices for which the device which has sent the response request message has sent the response request message is generated, transmitting a master setup request message to any one of the slave devices except for the master device, the slave device disconnected from the P2P communication with the master device, and the device not receiving the response signal;

Further, the resetting the master device of step (I), may comprise (I21) transmitting, by the device recognizing the disconnection of the P2P connection, a master configuration request message to any one of the slave devices except the master device and the slave device in which P2P communication is disconnected from the master device; (I22) sending, by the slave device receiving the master setup request message, a response request message to all other devices including the master device through the P2P communication;

(I23) transmitting, by the device receiving the response request message, a response signal through a P2P communication to the device transmitting the response request message;

(I24) transmitting a master change request message to a master device when the device which has sent the response request message has received a response signal from all devices which have sent the response request message; (I25) sending, by the master device receiving the master change request message, master resetting information to a device which has transmitted the master change request message, and resetting the device which has transmitted the master change request message to a master device.

In the content output system and method using a web browser-based multi-device according to the present invention as described above, the following effects can be expected.

That is, in the present invention, the master device and the slave device are set among the devices constituting the multi-vision so that synchronization and synchronization between the multiple display apparatuses are performed without a separate control terminal, thereby simplifying system configuration and saving cost.

In the present invention, each device is connected to the P2P based on the web browser, so that the synchronization between the devices can be achieved regardless of the operating OS of each device.

In addition, in the present invention, all of the devices constituting the multi-vision can be set as a master device, so that when the connection between the master device and the slave device is released, the device having a good connection state can be reset to the master device. Therefore, there is an effect that the synchronization between devices can be stably maintained.

DETAILED DESCRIPTION

Figure 1:
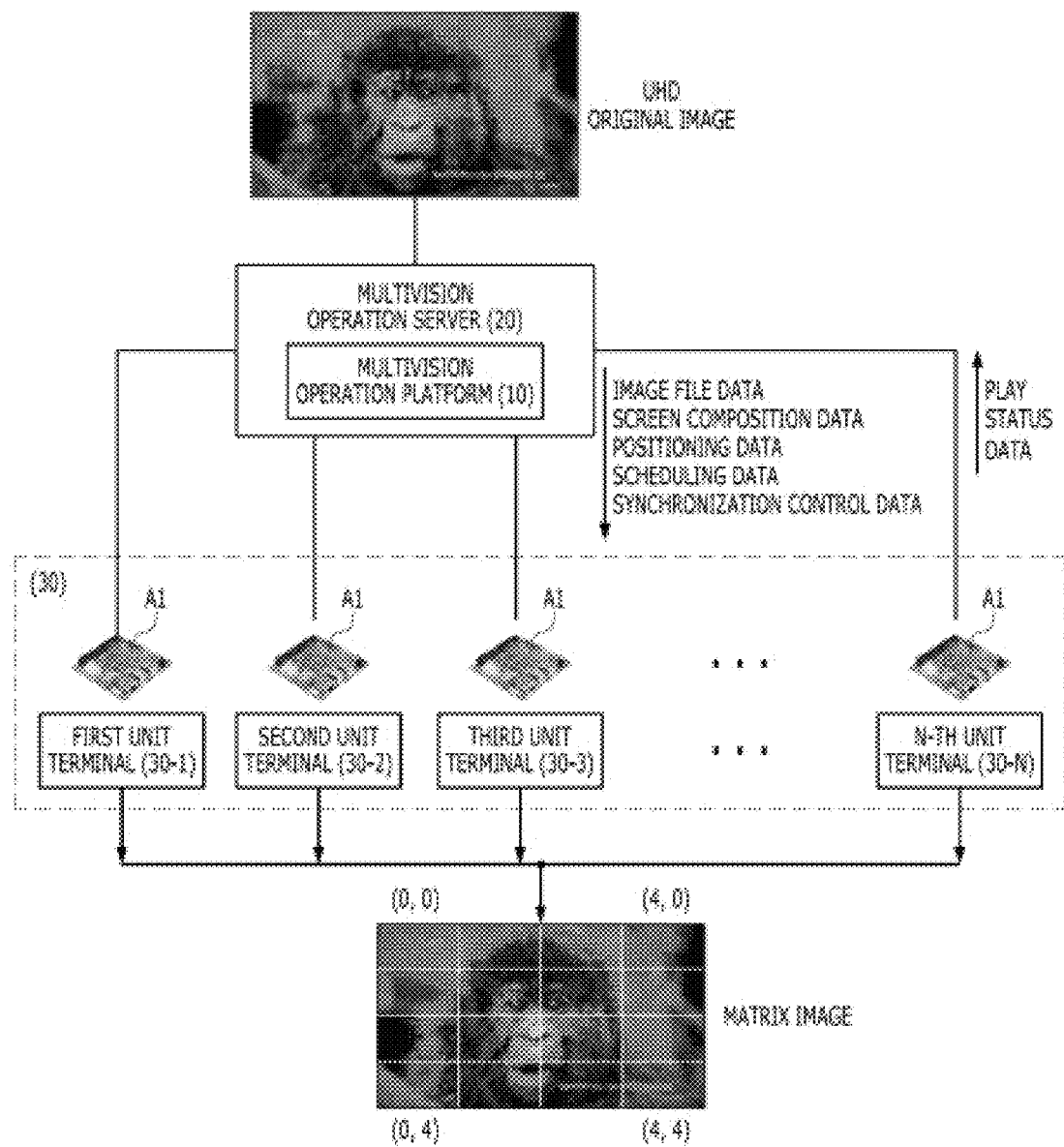
FIG. 1 is a conceptual diagram showing a multi-vision configuration according to the prior art.

Hereinafter, a content output system and method using a web browser-based multiple device according to a specific embodiment of the present invention will be described with reference to the accompanying drawings.

Prior to the description, the effects, features and methods of achieving the same of the present invention will be apparent in the embodiments described below in detail with the accompanying drawings.

However, the present invention is not limited to the embodiments disclosed below but may be implemented in various different forms.

However, the embodiments are provided so that the disclosure of the present invention may be completed and the scope of the present invention may be completely known to those skilled in the art. The present invention is only defined by the scope of the claims.

In describing the embodiments of the present invention, when it is determined that a detailed description of a known function or configuration may unnecessarily obscure the subject matter of the present invention, the detailed description thereof will be omitted.

The terms to be described below are terms defined in consideration of functions in the embodiments of the present invention, which may vary depending on the intention or custom of a user or an operator.

Therefore, the definition should be made based on the contents throughout the specification.

Combinations of each block of the accompanying block diagram and each step of the flowchart may be performed by computer program instructions (execution engine). These computer program instructions may be mounted on a processor of a general purpose computer, special purpose computer or other programmable data processing equipment.

Those instructions, which are executed through a processor of a computer or other programmable data processing equipment, generate means for performing the functions described in each block of the block diagram or in each step of the flowchart.

These computer program instructions may also be stored in a computer usable or computer readable memory that can direct a computer or other programmable data processing equipment to implement functionality in a particular manner.

Thus, it is also possible for instructions stored in the computer usable or computer readable memory to produce an article of manufacture containing instruction means for performing the functions described in each block of the block diagram or in each step of the flowchart.

And computer program instructions can also be mounted on a computer or other programmable data processing equipment, so that a series of operating steps are performed on the computer or other programmable data processing equipment to create a computer that executes the computer. Or instructions that perform other programmable data processing equipment may be included in each block of the block diagram and in each step of the flowchart.

In addition, each block or step may represent a portion of a module, segment or code that includes one or more executable instructions for executing specified logical functions. In some alternative embodiments it is also possible for the functions mentioned in the blocks or steps to occur out of order.

That is, the two blocks or steps shown may in fact be performed substantially concurrently, and it is also possible that the blocks or steps are performed in the reverse order of the corresponding function as required.

Hereinafter, specific embodiments of a content output system and method using a web browser-based multiple device according to the present invention as described above will be described in detail with reference to the accompanying drawings.

Figure 2:
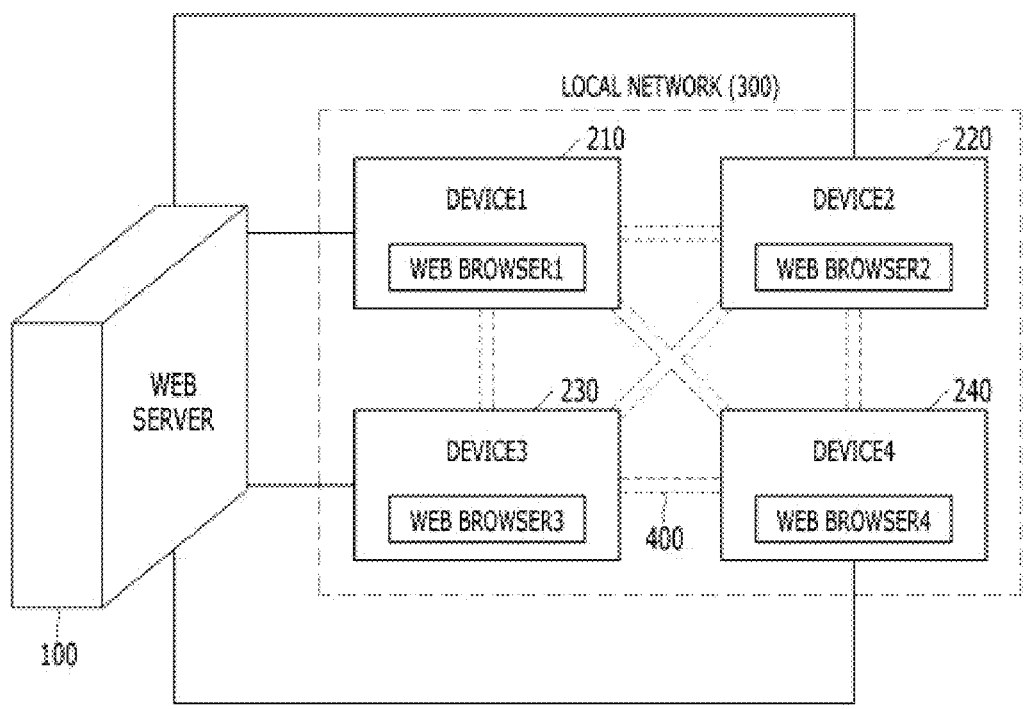
FIG. 2 is a block diagram illustrating a specific embodiment of a content output system according to the present invention.
Figure 3:
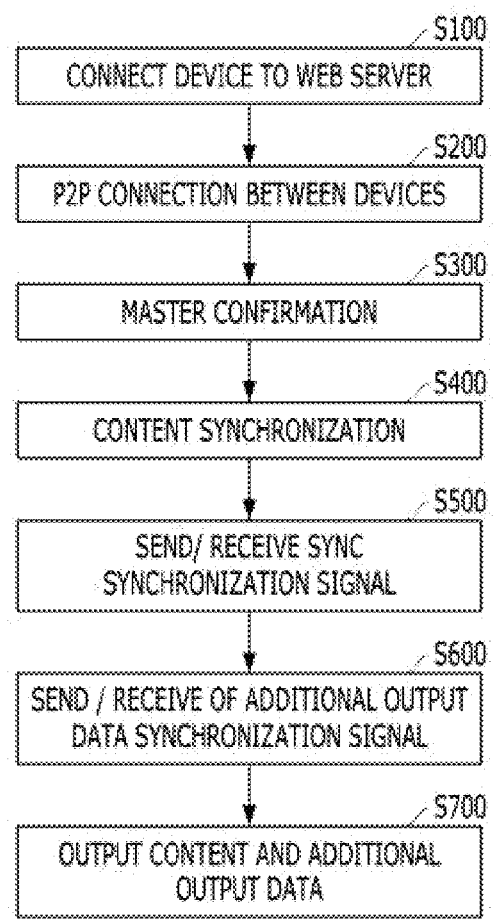
FIG. 3 is a flowchart illustrating a specific embodiment of a content output method according to the present invention.
Figure 4:
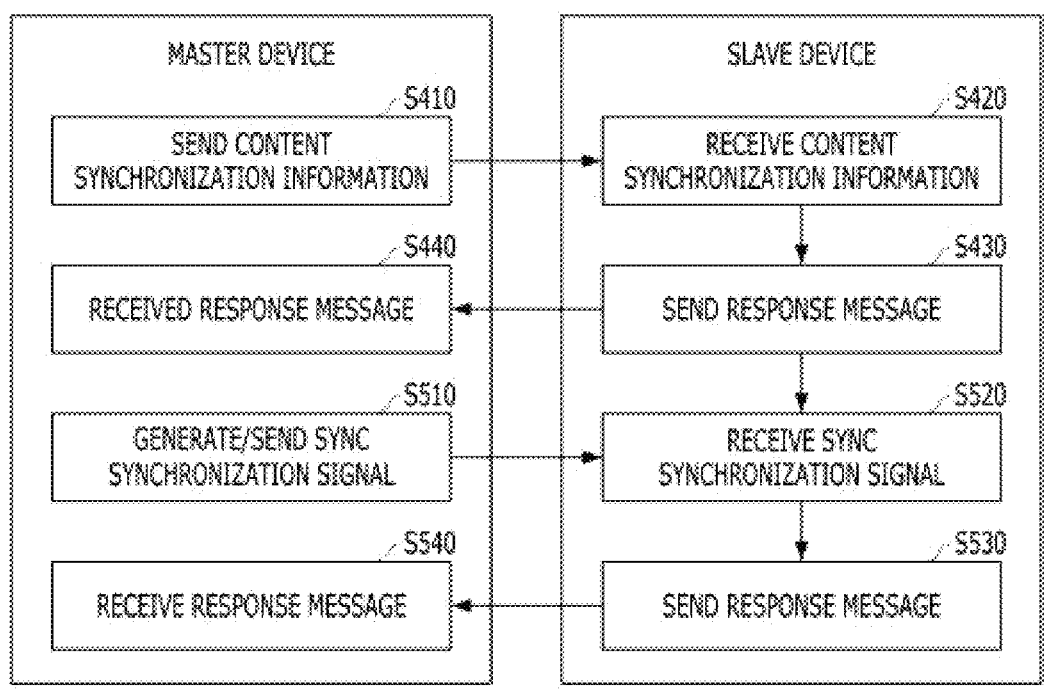
FIG. 4 is a flow diagram illustrating a specific embodiment of the output synchronization method of the content output method according to the present invention.
Figure 5:
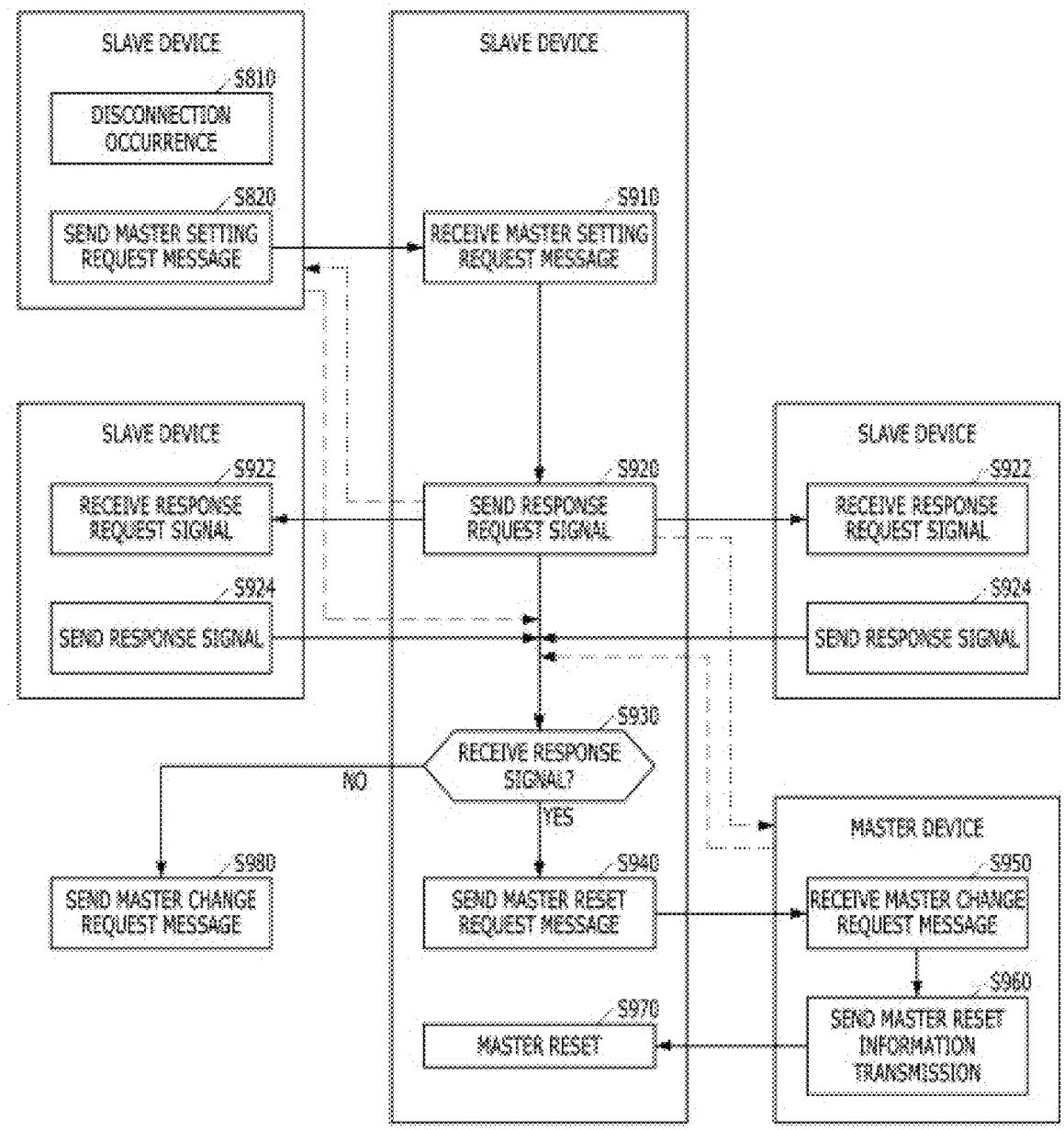
FIG. 5 is a flowchart illustrating a specific embodiment of a method for resetting a master device in a content output method according to the present invention.
Figure 6:
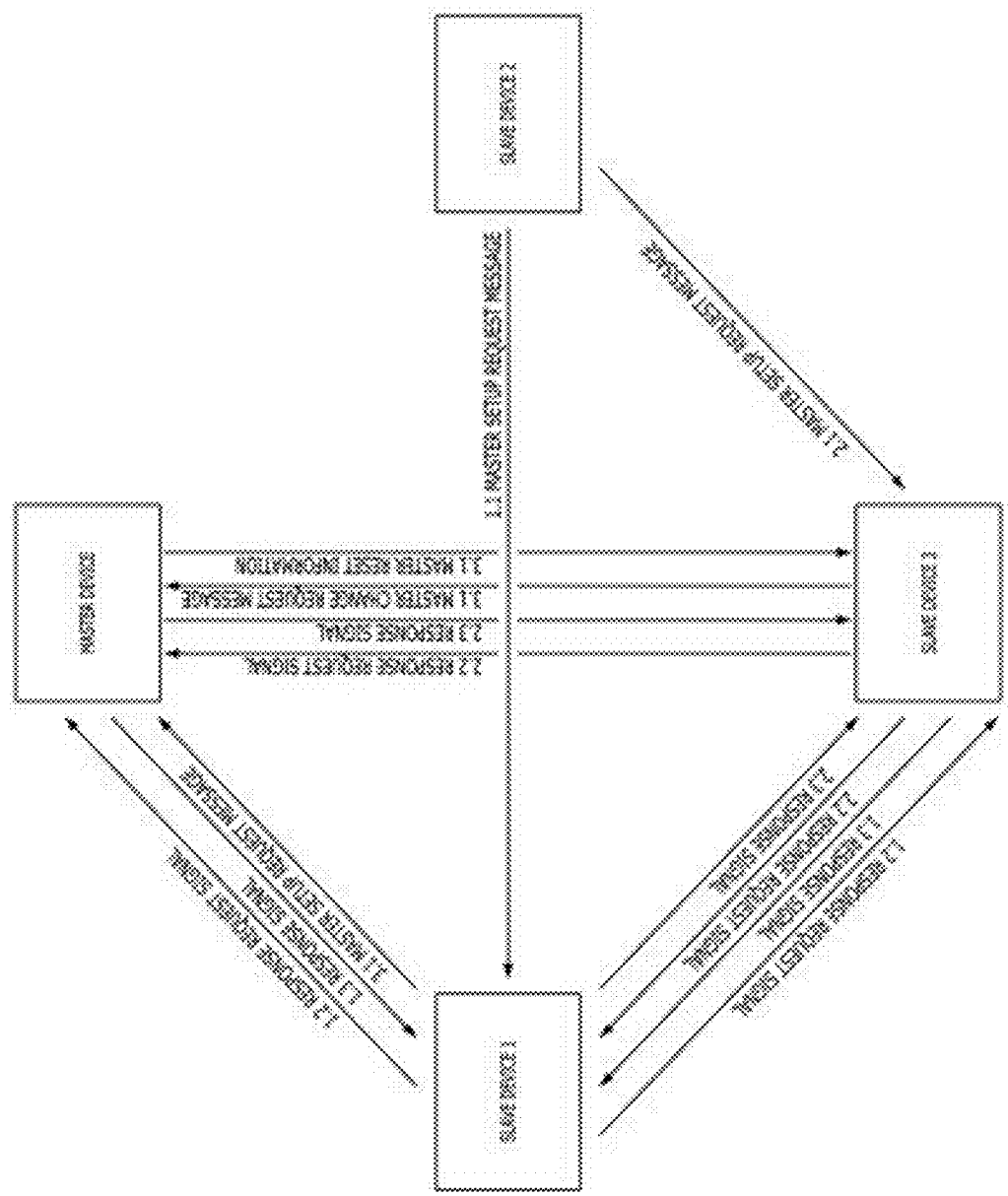
FIG. 6 is a flowchart illustrating another embodiment of a method for resetting a master device in a content output method according to the present invention.

FIG. 2 is a block diagram illustrating a specific embodiment of a content output system according to the present invention. FIG. 3 is a flowchart illustrating a specific embodiment of a content output method according to the present invention. FIG. 4 is a flowchart illustrating a specific embodiment of an output synchronization method among content output methods according to the present invention. FIG. 5 is a flowchart illustrating a specific embodiment of a method for resetting a master device among content output methods according to the present invention. FIG. 6 is a flowchart illustrating another embodiment of a method for resetting a master device in a content output method according to the present invention.

First, as shown in FIG. 2, the content output system according to the present invention basically comprises a web server 100 and the devices (210, 220, 230, 240, . . . ).

In this case, the web server 100 is to provide the content to be output to the devices (210, 220, 230, 240, . . . )

connected through the online, the web server 100 can be composed of various types of servers and storage devices, etc.

The devices 210, 220, 230, 240, . . . are composed of a plurality of display devices configuring a multi-vision to divide and output a single content.

To this end, each of the devices 210, 220, 230, 240, . . . has an output area to be divided and output among the contents according to the arrangement. To this end, each of the devices 210, 220, 230, 240, . . . has an output area to be divided and output among the contents according to the arrangement.

For example, as illustrated in FIG. 2, when four devices 210, 220, 230, and 240 are respectively installed in contact with each other up, down, left, and right, each of the devices 210, 220, 230, and 240 divides the content into four sections, and an area corresponding to the arrangement position is set as an output area.

Here, the devices (210, 220, 230, 240) is driven by an OS that can operate a web browser, the web browser is a web browser that supports Web Real Time Communication (WebRTC) The OS can be a variety of OS that the web browser can be operated.

That is, even if the devices 210, 220, 230, and 240 are heterogeneous equipment driven by different OSs, if each OS supports the same web browser that supports WebRTC, it can be adopted as a device constituting the present invention.

Accordingly, the devices according to the present invention can be composed of devices operated by different OS, thereby improving the compatibility of the system implementation.

At this time, the devices are divided into one master device and the other slave devices.

The master device may be configured with any one of the devices, or may be changed to another device.

These master devices and slave devices are connected to each other through peer-to-peer (P2P) communication through a real-time communication data channel (RTC Data Channel) 400 supported by WebRTC.

In this case, the devices (210, 220, 230, 240) interconnecting the full mesh architecture (full to be connected to the mesh topology), that is, the other devices are all in Darby device each and all are connected.

Accordingly, each device 210, 220, 230, 240 is first connected to the web server 100 and stun/tun to establish a connection between the web browsers of the devices 210, 220, 230, and 240. In this case, no connection to an external network is required.

On the other hand, when the devices 210, 220, 230, and 240 receive the output content from the web server 100 and output the output content, the master device generates the content synchronization information, the synchronization signal, and the additional output data synchronization signal and provides them to the device.

The content synchronization information is information indicating the order and start time of the contents to be output. Accordingly, the master device and the slave devices may output the same content at the same time.

Figure 7:
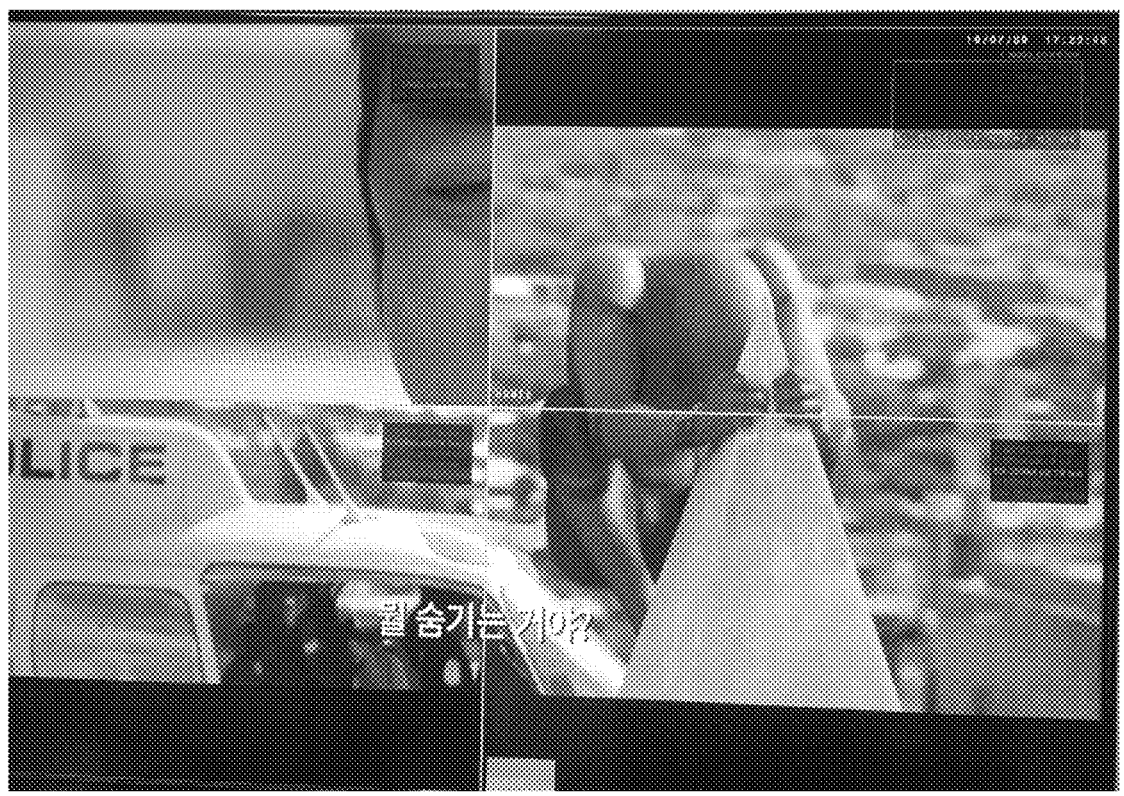
FIG. 7 is an exemplary view showing an example of an error in content synchronization in the content output system according to the present invention.
Figure 8:
FIG. 8 is an exemplary view showing an example of content synchronization and synchronization in the content output system according to the present invention.
Figure 9:
FIG. 9 is an exemplary view showing an example of the synchronization of the additional output data in the content output system according to the present invention.

FIG. 7 illustrates an example in which content synchronization is not performed as described above, so that different content is output from each device.

On the other hand, the synchronization signal is a signal for synchronizing the output time of the specific frame constituting the output content, it is simply generated at the time set by the master device is provided to the slave terminal.

Accordingly, each device outputs the same frame at the same time, so that the output timing of each device constituting the multi-vision can be matched.

The additional output data synchronization signal is a synchronization signal for synchronizing an output time point and a position of the additional output data when the additional output data is included in the output content. The additional output data is data that is added to the output content and output, and means subtitles or advertisement text, and may be added in the form of dynamic movement in the content.

As described above, the content synchronization information, the synchronization signal, and the additional output data synchronization signal are received from the master device and output the content in a synchronized state. Hereinafter, various embodiments of setting and resetting the master device will be described.

First, in an example of setting the master device, a sequence number to be designated as a master device is pre-assigned to each device, and an initial master device may be determined according to the specified sequence number.

On the other hand, the master device must basically maintain a P2P connection with all slave devices. Therefore, the master device is changed while the P2P connection between the master device and some or all slave devices is released.

Accordingly, in the present invention, when the connection between the master device and some slave devices is released, the master device is changed and set.

At this time, the new master device may be set as the master device by the specified order as described above.

Alternatively, a slave device may be designated among any of the other slave devices except the slave device in which P2P communication is disconnected from the master device and the master device, thereby maintaining a P2P communication connection with all other devices. The slave device can be set as a new master device by receiving master authority from the master device.

In this case, as the existing slave device disconnected from the P2P connection is excluded from the new master device target, the master device resetting process can be performed quickly.

On the other hand, the master device reset may set the slave device having the best P2P connection state as a new master device in consideration of the P2P connection state (speed) of each slave device.

That is, in the present invention, in resetting the master device, among the slave devices except for the slave device in which P2P communication is disconnected from the master device and the master device, there may be more than one slave device in which P2P communication connection is maintained with all other devices is maintained.

At this time, the priority of the new master device may be determined according to the P2P communication speed.

At this time, the P2P connection speed that determines the priority of the new master device is determined by the order in which the slave device completes the response message through P2P communication from all other devices.

A detailed method of resetting the master device as described above will be described again.

Hereinafter, the content output method using the web browser-based multiple device according to the present invention will be described in detail.

As shown in FIG. 3, a specific embodiment of the method for outputting content according to the present invention begins with connecting each device 210, 220, 230, 240 to the web server 100 (S100).

This is basically because each of the devices 210, 220, 230, 240 should be provided with the output content from the web server (100).

Next, P2P connection between the devices is performed (S200).

At this time, the connection between the devices is performed through a real-time communication data channel (RTC Data Channel) between the web browser, for this purpose, the web browser should support Web Real Time Communication (WebRTC, Web Real Time Communication).

Thus, the devices may be devices driven by different OSs as long as the OS can install the same web browser using the Web RTC protocol.

In this case, the P2P communication connection between the devices means connection of a full mesh topology. The connection of a full mesh topology means that one device is connected to all other devices.

And the master device is set so that the devices are divided into a master device and slave devices (S300).

The master device may initially be designated to a specific device, or may be set by the order set as described above.

Next, the master device provides the content synchronization information to the slave device to synchronize the content to be output (S400).

In this case, the content synchronization is to specify the content to be output by each device, when a plurality of content is output in succession, to schedule the order of the content, and to specify the output start time of the output content to synchronize.

The content synchronization information is information indicating the order and start time of the contents to be output.

The content synchronization process will be described in detail. As illustrated in FIG. 4, the master device generates the content synchronization signal and transmits it to the slave device (S410). Upon receiving the content synchronization signal, the slave device generates a response message and transmits the response message to the master device (S420 and S430).

Accordingly, the master device may receive the response message, check the content output preparation state of the slave device, and check the P2P connection state of the slave device (S440).

In addition, the output content is output, and the master device provides a synchronization signal to the slave device by a predetermined time unit to synchronize the sync of the output content (S500).

That is, the master device provides a synchronization signal indicating an output time of a specific frame of the output content to the slave device, and the devices output the content according to the synchronization signal. Therefore, the sync of the output content output from all devices is synchronized.

The synchronization process will be described in detail. As shown in FIG. 4, the master device generates and transmits the synchronization signal to the slave device (S510), and the slave device receiving the synchronization signal generates a response message to generate the master device. (S520, S530).

In this case, since the synchronization signal is generated and transmitted in a predetermined time unit, the master device periodically receives the response message, checks the P2P connection state of the slave device, and disconnects communication of the slave device. Disconnection) can be checked (S540).

Of course, in this case, the slave device may also check whether disconnection with the master device occurs according to whether or not periodic synchronization signals are received.

On the other hand, when the output content includes the additional output data in the output content, for synchronizing each of the devices of the additional output data, the master device generates an additional output data synchronization signal for synchronizing the output time and position of the additional output data to provide to the slave device (S600).

In this case, the additional output data may be text data such as subtitles or advertisements inserted into the output content, and the additional output data may be added in a form in which dynamic motion is added to the output content.

In operation S700, the master device and the slave devices add additional output data to the output content according to the additional output data synchronization signal.

Next, the reset process of the master device when the disconnection between the master device and the slave device occurs will be described in detail.

To this end, the present invention continuously checks the P2P connection state between the master device and each slave device in outputting the output content.

In this case, the confirmation of the P2P connection state may be determined by receiving the synchronization signal (slave device) and receiving a response message (master device).

Accordingly, when at least one P2P communication between the master device and the slave devices is disconnected, the master device is reset.

The method of resetting the master device is largely divided into three embodiments in the present invention.

The first embodiment of resetting the master device is an embodiment in which the master device is determined by a predetermined order.

That is, when disconnection occurs while the first device is set as the master device, the second device is reset to the master device. If disconnection occurs while the second device is set as the master device, the third device is reset to the master device.

The second embodiment of resetting the master device is an embodiment in which a slave device in which disconnection is occurred is excluded and a slave device in which P2P communication connection is completely maintained among other devices is set as a new master device.

Specifically, as illustrated in FIG. 5, when disconnection is detected in a specific device (S810), the master setup request message is transmitted to another slave device (S820).

In this case, the other slave device refers to the remaining slave devices except for the current master device and the slave device in which P2P communication with the current master device is disconnected.

Thereafter, the slave device receiving the master setup request message (S910) transmits a response request message to all other devices including the master device through P2P communication (S920).

Accordingly, the device receiving the response request message transmits the response signal through the P2P communication to the device transmitting the response request message (S922 and S924).

Thereafter, the device sending the response request message receives the response signals from the devices transmitting the response request message to check the P2P connection state (S920).

That is, when the device sending the response request message receives the response signal from all the devices sending the response request message, the device sending the response request message indicates that the P2P connection is maintained with all other devices. In this case, the master change request message is transmitted to the master device (S940).

In this case, the master change request message is a message for requesting the transfer of master device authority to the master device, and the master device receiving the master change request message sends the master change request message to the device sending the master change request message (S950, S960). The device sending the master change request message is reset to the master device by receiving the master reset information (S970).

On the other hand, if a device in which a response signal is not received among the devices which have sent the response request message is generated, this means that there is a disconnection between the device which has sent the response request message and the other devices. In this case, the device that transmits the response request message transmits a master setup request message to one of the remaining slave devices except the master device, the slave device disconnected from the P2P communication with the master device, and the device not receiving the response signal (S980).

According to this, the slave device newly receiving the master setup request message repeats steps 910 to 980 to set a new master device.

According to this embodiment, the master device may be reset by re-checking the P2P connection state, except for devices in which disconnection is generated in the master device resetting process. Therefore, not only the master device resetting process is quick, but also the stability of the P2P connection state by the newly set master device can be secured.

Next, the third embodiment of resetting the master device excludes the device where the disconnection is generated, and sets the slave device with the best P2P communication connection state among the remaining devices as the new master device. In this embodiment, in consideration of the P2P connection state (speed), the slave device in which the best connection state is maintained can be set as a new master device.

Specifically, as shown in FIG. 6, the device (slave device 2) that recognizes that the disconnection has occurred is left except for the master device and the slave device in which P2P communication with the master device is disconnected. The master setup request message is transmitted to all slave devices (slave devices 1 and 3) (1.1).

In detail, as illustrated in FIG. 6, the device recognizing that disconnection is generated (slave device 2) transmits a master setup request message (1.1) to all the slave devices (slave devices 1 and 3) except the slave device where the P2P communication is disconnected from the master device and the master device.

Subsequently, the slave devices receiving the master configuration request message transmit response request messages through P2P communication to all other devices including the master device (1.2 and 2.2).

Each of the devices receiving the response request message transmits a response signal through P2P communication for each response request message received (1.3, 2.3).

Thereafter, when the device that has sent the response request message receives the response signal from all the devices which have sent the response request message, the device transmits the master change request message to the master device (3.1).

In this case, when the slave device transmits the master change request message, it means that the P2P connection between the slave device and all other devices is maintained.

On the other hand, the master device transmits the master reset information to the first device for which the master change request message is first received among the received master change request messages, and resets the device to a new master device (3.2).

That is, even if a master change request message is received from two or more slave devices, the P2P connection state of the first device to which the master change request message is first received is the best (good transmission rate). Reflecting this, the slave device with the best P2P connection is reset to the new master slave, so that the synchronization result can be maintained at the best.

The rights of the present invention are not limited to the embodiments described above, but are defined by what is stated in the claims, and it is obvious that various modifications and adaptations within the scope of the claims could be provided by those skilled in the art.

The present invention implements a multi-vision display system. Specifically, the present invention relate to A content output system and method using multiple devices, wherein each device is connected to P2P communication based on a web browser without a separate control device to synchronize sync and schedule of output content between devices.

According to the present invention, the master device and the slave device are set among the devices constituting the multi-vision, so that the synchronization and synchronization between the multiple display apparatuses are performed without a separate control terminal, thereby simplifying the system configuration and reducing the cost.

What is claimed is:

1. A content output system comprising:
   a web server for providing contents to be output to a web-connected terminal; and
   a plurality of devices connected to the web server to output the provided contents, the plurality of devices respectively outputting a predetermined area of each of the contents,
   wherein the plurality of devices are operated by a web browser supporting Web Real-Time Communication (WebRTC) and connected to each other through peer-to-peer communication through a real-time communication data channel (RTC Data Channel); and
   the plurality of devices comprise:
   a master device for generating and providing content synchronization information for specifying a time-series order of the contents to be output and a synchronization signal for specifying an output timing of the contents to be output; and
   at least one slave device for outputting the contents according to the content synchronization information and the synchronization signal provided from the master device-;
   wherein, when a specific device detects disconnection of the P2P communication between the master device and the at least one slave device, the specific device transmits the master setup request message to the other slave device except for the master device and the slave device in which the P2P communication with the master device is disconnected, wherein the slave device receiving the master setup request message transmits a response request message through the P2P communication to all other devices, wherein the device receiving the response request message transmits a response signal through the P2P communication to the slave device transmitting the response request message, wherein the slave device receiving the response signal from all other devices transmits a master change request message through the P2P communication to the master device, wherein the master device receiving the master change request message transmits a master reset information through the P2P communication to the slave device transmitting the master change request message, and wherein the slave device transmitting the master change request message is reset to a new master device by receiving the master reset information.

2. The content output system of claim 1, wherein each of the plurality of devices are connected to each other in a full mesh topology.

3. The content output system of claim 2, wherein the content synchronization information is information indicating the time-series order and a start time of each of the contents to be output.

4. The content output system of claim 3, wherein the synchronization signal is a signal for synchronizing output times of frames constituting each of the contents to be output, and is generated and provided in a predetermined time unit.

5. The content output system of claim 4, wherein, if the contents to be output include additional output data, the master device generates an additional output data synchronization signal for synchronizing an output time point and a position of the additional output data and provides the additional output data synchronization signal to the at least one slave device.

6. The content output system of claim 5, Wherein the additional output data is caption or advertisement data.

7. A method for outputting contents through a content output system comprising a web server for providing contents to be output to a web-connected terminal, and devices for outputting contents provided by accessing the web server and outputting a predetermined area, respectively, of each of the contents, comprising:

connecting the devices to the web serve;

connecting the devices to each other in a peer to peer (P2P) communication through a web browser supporting Web Real-Time Communication (WebRTC);

setting one of the devices as a master device and the other devices as slave devices;

providing, by the master device, content synchronization information to the slave devices to synchronize the contents to be output;

providing, by the master device, a synchronization signal to the slave devices, and outputting, by the master device and the slave devices, the contents according to the synchronization signal;

checking a status of P2P connection in performing the providing the content synchronization information to the slave devices and the providing of the synchronization signal to the slave devices; and when a connection between the master device and at least one of the slave devices is disconnected, resetting one of the slave devices which are not disconnected to the master device as a new master device, wherein the resetting of the one of the slave devices comprise:

transmitting, by a specific device detecting disconnection of the P2P communication between the master device and the at least one slave device, a master setup request message to the other slave device except for the master device and the slave device in which the P2P communication with the master device is disconnected;

transmitting, by the slave device receiving the master setup request message, a response request message through the P2P communication to all other devices;

transmitting, by the device receiving the response request message, a response signal through the P2P communication to the slave device transmitting the response request message;

transmitting, by the slave device receiving the response signal from all other devices, a master change request message through the P2P communication to the master device; and transmitting, by the master device receiving the master change request message, a master reset information through the P2P communication to the slave device transmitting the master change request message, wherein the slave device transmitting the master change request message is reset to a new master device by receiving the master reset information.

8. The method of claim 7, wherein the P2P communication is a connection of a full mesh topology.

9. The method of claim 8, wherein the content synchronization information is information indicating an order and start time of the contents to be output.

10. The method of claim 9, wherein the synchronization signal is a signal for synchronizing output times of frames constituting each of the contents to be output and is provided in a predetermined time unit.

11. The method according to claim 10, wherein, if the contents to be output include additional output data, the method further comprises:

Generating an additional output data synchronization signal for synchronizing an output time point and position of the additional output data and providing the synchronization signal to the slave devices; and adding the additional output data to the contents to be output according to the additional output data synchronization signal and outputting the additional output data to the contents.

12. The method of claim 11, wherein the additional output data is caption or advertisement data.

* * * * *